United States Patent
Kim

(10) Patent No.: US 9,514,751 B2
(45) Date of Patent: Dec. 6, 2016

(54) SPEECH RECOGNITION DEVICE AND THE OPERATION METHOD THEREOF

(71) Applicant: Electronics and Telecommunications Research Institute, Daejeon (KR)

(72) Inventor: Dong-Hyun Kim, Daejeon (KR)

(73) Assignee: ELECTRONICS AND TELECOMMUNICATIONS RESEARCH INSTITUTE, Daejeong (KR)

( * ) Notice: Subject to any disclaimer, the term of this patent is extended or adjusted under 35 U.S.C. 154(b) by 0 days.

(21) Appl. No.: 14/224,427

(22) Filed: Mar. 25, 2014

(65) Prior Publication Data

US 2015/0081288 A1 Mar. 19, 2015

(30) Foreign Application Priority Data

Sep. 17, 2013 (KR) .......................... 10-2013-0111673

(51) Int. Cl.
*G10L 15/183* (2013.01)
*G10L 15/30* (2013.01)
(Continued)

(52) U.S. Cl.
CPC .............. *G10L 15/30* (2013.01); *G10L 15/183* (2013.01); *G10L 15/187* (2013.01); *G10L 2015/228* (2013.01)

(58) Field of Classification Search
None
See application file for complete search history.

(56) References Cited

U.S. PATENT DOCUMENTS

| 4,852,181 A | * | 7/1989 | Morito | .................... G10L 15/20 704/233 |
| 2005/0078172 A1 | * | 4/2005 | Harville | ................. H04N 7/142 348/14.09 |

(Continued)

FOREIGN PATENT DOCUMENTS

| KR | 10-2011-0100620 | 9/2011 |
| WO | WO 2010-054373 | 5/2010 |

OTHER PUBLICATIONS

Ahmad Emami et al., "Large-Scale Distributed Language Modeling", Proceeding of ICASSP2007, vol. 4, pp. 37-40, 2007.

(Continued)

*Primary Examiner* — Pierre-Louis Desir
*Assistant Examiner* — Jonathan Kim
(74) *Attorney, Agent, or Firm* — Staas & Halsey LLP

(57) ABSTRACT

Described herein is a speech recognition device comprising: a communication module receiving speech data corresponding to speech input from a speech recognition terminal and multi-sensor data corresponding to input environment of the speech; a model selection module selecting a language and acoustic model corresponding to the multi-sensor data among a plurality of language and acoustic models classified according to the speech input environment on the basis of previous multi-sensor data; and a speech recognition module controlling the communication module to apply a feature vector extracted from the speech data to the language and acoustic model and transmit speech recognition result for the speech data to the speech recognition terminal.

9 Claims, 4 Drawing Sheets

(51) Int. Cl.
  *G10L 15/187* (2013.01)
  *G10L 15/22* (2006.01)

(56) References Cited

U.S. PATENT DOCUMENTS

| | | | |
|---|---|---|---|
| 2005/0144013 A1* | 6/2005 | Fujimoto | G10L 15/22 704/277 |
| 2011/0066433 A1* | 3/2011 | Ljolje | G10L 15/07 704/236 |
| 2011/0093265 A1* | 4/2011 | Stent | G10L 15/06 704/243 |
| 2012/0059653 A1* | 3/2012 | Adams et al. | 704/243 |
| 2013/0156207 A1* | 6/2013 | Visser | H04M 1/0206 381/57 |
| 2013/0332147 A1* | 12/2013 | Corfield | 704/201 |
| 2014/0039888 A1* | 2/2014 | Taubman | H04M 1/72572 704/235 |
| 2014/0142928 A1* | 5/2014 | Campbell | G10H 1/0091 704/201 |

OTHER PUBLICATIONS

Françoise Beaufays et al., "Unsupervised Discovery and Training of Maximally Dissimilar Cluster Models", Proceeding of INTERSPEECH2010, pp. 66-69, Sep. 26-30, 2010.

* cited by examiner

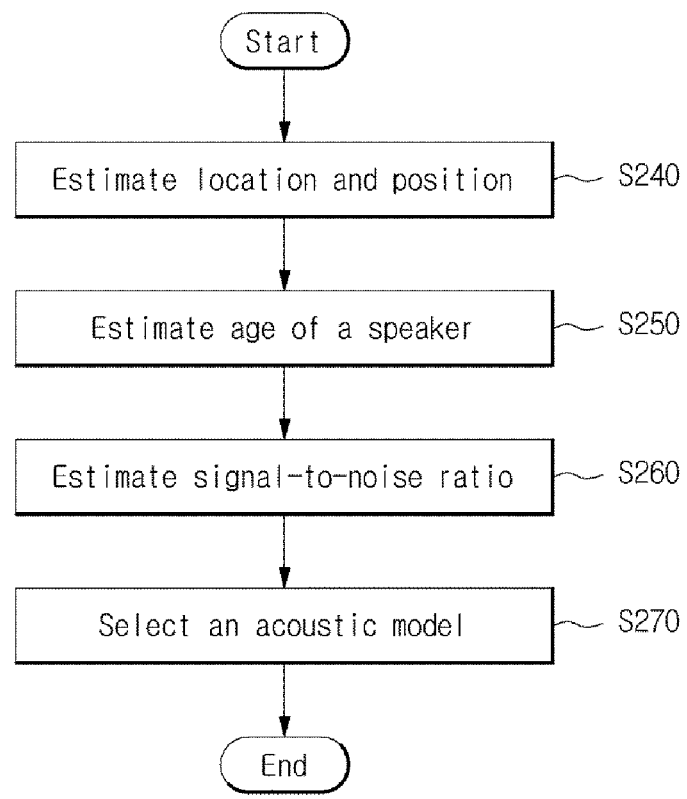

SPEECH RECOGNITION DEVICE AND THE OPERATION METHOD THEREOF

CROSS REFERENCE TO RELATED APPLICATION

This application claims the benefit of Korean Patent Application No. 10-2013-0111673, filed on Sep. 17, 2013, entitled "Speech recognition device and the operation method thereof", which is hereby incorporated by reference in its entirety into this application.

BACKGROUND OF THE INVENTION

1. Technical Field

The present invention relates to a speech recognition device and its operation method and more particularly, to a speech recognition device and its operation method which can improve speech recognition performance for speech data by using multi-sensor data when speech data and multi-sensor data are input from a speech recognition terminal.

2. Description of the Related Art

A conventional method for improving speech recognition performance using information in addition to speech information is a method using both camera image information and speech information.

Audio-visual speech recognition, which uses image processing capabilities in lip reading to aid speech recognition, has been developed for this purpose. Image information has been developed to use for lip reading and to aid audio acoustic models which are noise sensitive. This utilizes additional feature information for acoustic models based on matching speech with lips images.

Audio-visual application is also used as speech endpoint detection method for speech recognition in noisy environment such as inside the car and is also applied to technologies to catch the start and end points of speech by tracing shapes of mouth.

A great deal of development research is currently under way on speech detection using multi-sensors included in a terminal.

SUMMARY OF THE INVENTION

An object of the invention is to provide a speech recognition device and its operation method which can improve speech recognition performance for speech data by using multi-sensor data when speech data and multi-sensor data are input from a speech recognition terminal.

The speech recognition device according to an embodiment comprises: a communication module receiving speech data corresponding to speech input from a speech recognition terminal and multi-sensor data corresponding to input environment of the speech; a model selection module selecting a language and acoustic model corresponding to the multi-sensor data among a plurality of language and acoustic models classified according to the speech input environment on the basis of previous multi-sensor data; and a speech recognition module controlling the communication module to apply a feature vector extracted from the speech data to the language and acoustic model and transmit speech recognition result for the speech data to the speech recognition terminal.

The multi-sensor data according to an embodiment comprises at least one of location data for location and position of the speech recognition terminal, image data for a speaker who inputs the speech, and proximity data for the distance between the speech recognition terminal and the speaker.

The model selection module according to an embodiment comprises: a first estimation unit estimating location and position of the speech recognition terminal on the basis of the location data; a second estimation unit estimating age of the speaker on the basis of the image data; a third estimation unit estimating signal-to-noise ratio (SNR) for the speech data on the basis of the proximity data; and a selection unit selecting the language and acoustic model on the basis of the location and position, the age and the signal-to-noise ratio estimated from the first to the third estimation unit.

The model selection module according to an embodiment further comprises a database storing the plurality of language and acoustic models classified according to speech input environment on the basis of the previous multi-sensor data.

The speech recognition module according to an embodiment comprises: a preprocessing unit extracting the feature vector from the speech data; and a speech recognition unit controlling the communication module to apply the feature vector to the language and acoustic model and transmit speech recognition result for the speech data to the speech recognition terminal.

The preprocessing unit according to an embodiment extracts the feature vector by classifying the speech data into frame units and eliminating frame-basis noise components.

A method for operating a speech recognition device according to an embodiment comprises: receiving speech data corresponding to speech input from a speech recognition terminal and multi-sensor data corresponding to input environment of the speech; selecting a language and acoustic model corresponding to the multi-sensor data among a plurality of language and acoustic models classified according to speech input environment on the basis of previous multi-sensor data; and transmitting speech recognition result for the speech data to the speech recognition terminal obtained by applying a feature vector extracted from the speech data to the language and acoustic model.

The multi-sensor data according to an embodiment comprises at least one of location data for location and position of the speech recognition terminal, image data for a speaker who inputs the speech, and proximity data for the distance between the speech recognition terminal and the speaker.

The selection step comprises: estimating location and position of the speech recognition terminal on the basis of the location data; estimating age of the speaker on the basis of the image data; estimating signal-to-noise ratio (SNR) for the speech data on the basis of the proximity data; and selecting the language and acoustic model on the basis of the location and position, the age and the signal-to-noise ratio estimated from the first estimating step to the third estimating step.

The transmitting step comprises: extracting the feature vector from the speech data; and transmitting speech recognition result for the speech data to the speech recognition terminal obtained by applying the feature vector to the language and acoustic model.

The extracting step classifies the speech data into frame units and eliminates frame-basis noise components.

The speech recognition device and its operation method according to an embodiment allows selecting a proper acoustic model and language model to input environment when speech of a speaker is input by using speech data and multi-sensor data from a speech recognition terminal and transmitting the result of which speech recognition performance for the speech data is improved.

Furthermore, the speech recognition device and its operation method according to an embodiment can be implemented separately from a speech recognition terminal so that it reduces the volume of memory of the speech recognition terminal.

BRIEF DESCRIPTION OF THE DRAWINGS

FIG. 4 is a flowchart illustrating a selection of an acoustic model.

DESCRIPTION OF THE EXEMPLARY EMBODIMENTS

Figure 1:
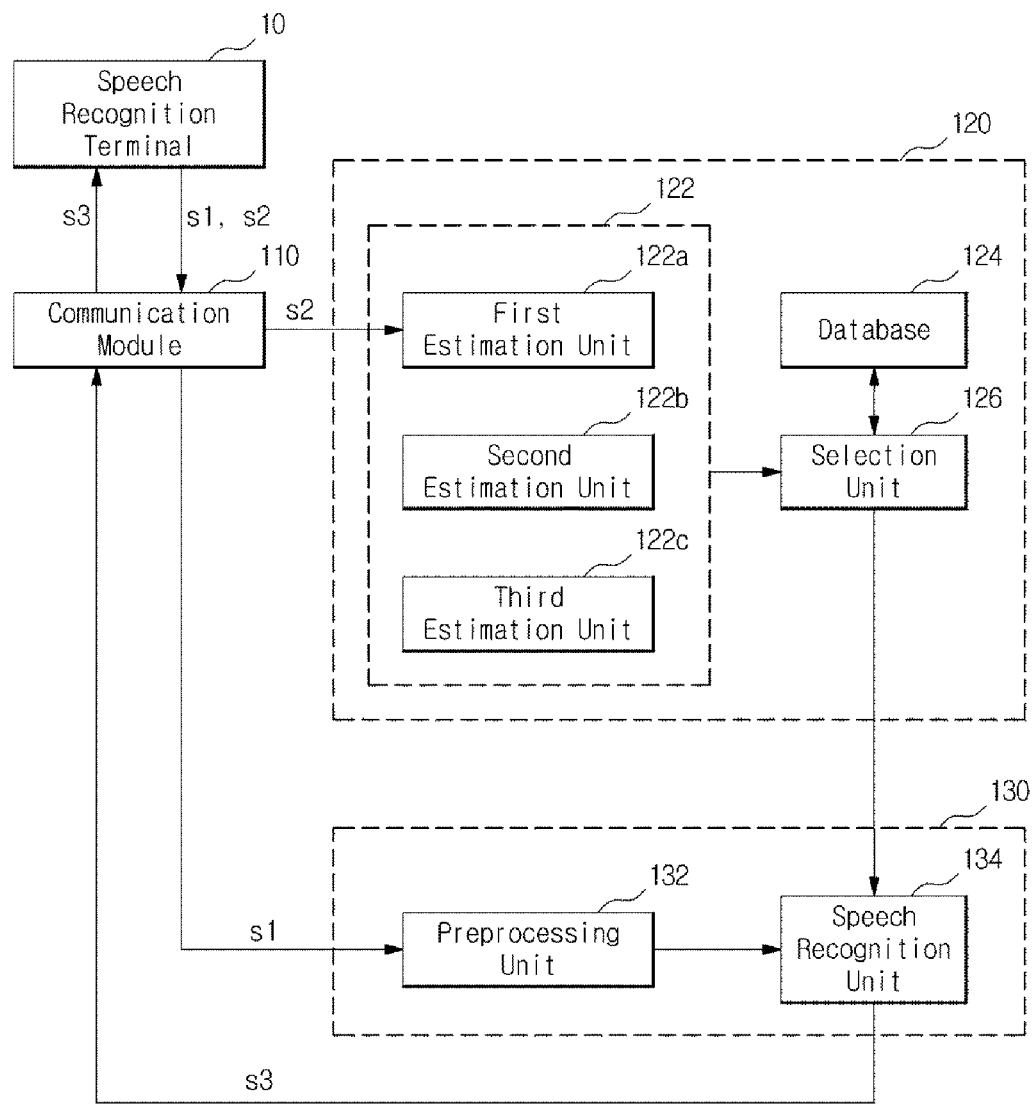
FIG. 1 is a block diagram illustrating a control constitution of a speech recognition device according to an embodiment.

Hereinafter, embodiments of the present invention will be described with reference to the accompanying drawings. In denoting reference numerals for components in each of the drawings, components having the same name may be denoted by the same reference numerals in different drawings. Furthermore, throughout the description of the present invention, when describing a certain technology is determined to evade the point of the present invention, the pertinent detailed description will be omitted. While it has been described with reference to particular embodiments, it is to be appreciated that various changes and modifications may be made by those skilled in the art without departing from the spirit and scope of the embodiment herein, as defined by the appended claims and their equivalents.

FIG. 1 is a block diagram illustrating a control constitution of a speech recognition device according to an embodiment.

Referring to FIG. 1, a speech recognition device may include a communication module 110, a model selection module 120 and a speech recognition module 130.

In this embodiment, the speech recognition device may be a speech recognition server or a device equipped apart from a speech recognition terminal 10 but it is not limited thereto.

The communication module 110 receives speech data s1 corresponding to speech input from the speech recognition terminal 10 and multi-sensor data s2 corresponding to input environment of the speech.

Here, the communication module 110 may classify the speech data s1 and the multi-sensor data s2 to transmit to the model selection module 120 and the speech recognition module 130, respectively.

The model selection module 120 may include estimation units 122, a database 124 and a selection unit 126.

The speech recognition terminal 10, when speech is input through a microphone (not shown) from a speaker, may include a proximity sensor (not shown) generating proximity data for the distance between the speaker and the speech recognition terminal 10, a camera (not shown) generating image data by taking an image of the speaker, and WiFi and GPS generating location data for location and position of the speaker, namely the speech recognition terminal 10.

The multi-sensor data s2, as described above, may include at least one of the proximity data, the image data and the location data but it is not limited thereto.

The estimation unit 122 may include a first estimation unit 122a estimating location and position of the speech recognition terminal on the basis of the location data, a second estimation unit 122b estimating age of the speaker on the basis of the image data, and a third estimation unit 122c estimating signal-to-noise ratio (SNR) for the speech data on the basis of the proximity data.

In an embodiment, the estimation unit 122 is explained with including only the first to the third estimation units 122a-122c but it is not limited thereto.

The location data may be generated by location based services (LBS) which refer to all types of services relating to collections, uses and provisions of location information and provide the user with location information obtained through a network or a global positioning system (GPS).

The location based service may be divided into a network-based method, a satellite signal-based method, a WiFi signal-based method, and a combined method according to location measurement methods.

The network-based method determines locations using a cell ID of the base transceiver station of a mobile communication network and a distance between the base transceiver station and the terminal, and the satellite signal-based method determines locations based on signals received from global position systems. The WiFi signal-based method, which is a kind of the network-based methods, determines locations using WiFi AP (access point) locations and it thus called as WiFi positioning system (WPS). The combined method determines locations of a mobile device using the network-based method, the satellite signal-based method, and the WiFi signal-based method and is thus called as hybrid positioning system (XPS).

The age data may estimate the age of a speaker using a facial recognition technology. The facial recognition technology has been widely developed in various fields such as image processing, pattern recognition, computer vision and neural network and has been variously applied to identify a person, track the same person or restore a face, etc. using a still picture or video.

The facial recognition is configured to include separation of facial parts, extraction of facial features, and classification. This facial recognition uses from typical edge extracted images to gray-level images to extract local features from a face and applies a statistical method such as Karhunen-Loeve transform using eigenvectors of data and a structural method using locations of and distances between eyes, nose, lips and the like to extract facial features. Feature vectors called as eigenpictures or eigenfaces as a statistical method can be used for facial recognition. An input image can be expressed into dimension-reduced weighed vectors by allowing eigenfaces and similarity can be recognized using distances between the weighed vectors. Neural networks are used for facial recognition by recognizing gender classification and facial expressions recognition by using numerical features such as thickness of eyebrow, width of nose, width of mouth and the like. In addition, side-view facial recognition and 3-D facial recognition have been also developed.

Various products have been developed due to such facial recognition technologies and developments with released open APIs, for example, cigarette vending machines selling cigarettes by estimating age and advertisement displayers displaying by estimating gender and age through facial recognition in Japan. Technologies to detect age and gender extract facial features such as hair style, winkles around eyes and mouth, shapes of local parts of a face around blemishes, direction of outer corners of eyes and distances such as size of eyes as parameters and use estimation methods through statistical pattern recognition and regression analysis with such features and locations.

Accordingly, the second estimation unit 122b can select an acoustic and language model representing a proper gender and age range of the speaker from the pre-classified acoustic and language models by transmitting information as side information for speech recognition, which estimates gender and age of the speaker, along with speech as performance to estimate gender and age is improved using a camera in facial recognition.

The proximity data allows estimating signal-to-noise ratio of background noise in addition to speech when speech is input to the speech recognition terminal 10.

Generally, the signal-to-noise ratio is determined by measuring energy of silence interval and energy of speech interval. A method for estimating overall signal-to-noise ratio with background sounds is also proposed before determining the energy of speech interval.

The proximity data estimates the signal-to-noise ratio by using a method for analyzing decibel (db) of background noise which is the silence interval and a proximity sensor determining a distance between a microphone and a face.

This method is borrowed from the habit of placing a microphone closer to mouth in noisy surroundings in the method for estimating signal-to-noise ratio with only background noise ($V_N$) and can represent distinguish differences between noisy and silent surroundings using decibel of background noise, distance to the microphone and a correction factor ($\alpha$). Since it is also processed when recording with a low voice by being close to a microphone, the signal-to-noise ratio can be estimated by using the following Equation 1 in case example determining relationship between decibel of actual voice ($V_S$) and distance data obtained by the proximity sensor.

$$SNR = \left(1 - \frac{\alpha D}{\log_{10} V_S}\right) \times 20 \log_{10}\left(\frac{V_S}{V_N}\right) \qquad \text{Equation 1}$$

The database 124 may classify a plurality of language and acoustic models according to speech input environment on the basis of the previous multi-sensor data and store the result. Namely, the database 124 can update additionally when the previous multi-sensor data for the speech input environment is input but it is not limited thereto.

The selection unit 126 selects a language and acoustic model from the plurality of language and acoustic models stored in the database 124 through the location and position, the age and the signal-to-noise ratio estimated by the first to the third estimation units 122a-122c and transmits the result to the speech recognition unit 134 of the speech recognition module 130.

For example, the selection unit 126 identifies location and position of the speech recognition terminal 10 or the speaker on the basis of the location and position estimated from the first estimation unit 122a and selects a language model corresponding to the age range of the speaker on the basis of the age estimated from the second estimation unit 122b. The selection unit 126, as described above, also identifies location and position of the speech recognition terminal 10 or the speaker on the basis of the location and position estimated from the first estimation unit 122a and selects an acoustic model through age of the speaker on the basis of the age estimated from the second estimation unit 122b and the signal-to-noise ratio estimated from the third estimation unit 122c.

The speech recognition module 130 may include a preprocessing unit 132 and a speech recognition unit 134. The preprocessing unit 132 extracts the feature vector from the speech data. Namely, the preprocessing unit 132 may classify the speech data into frame units and then extract the feature vector by eliminating frame-basis noise components.

The speech recognition unit 134 then controls the communication module 110 to transmit speech recognition result for the speech data, obtained by applying the feature vector to the language and acoustic model selected from the selection unit 126, to the speech recognition terminal 10.

Figure 2:
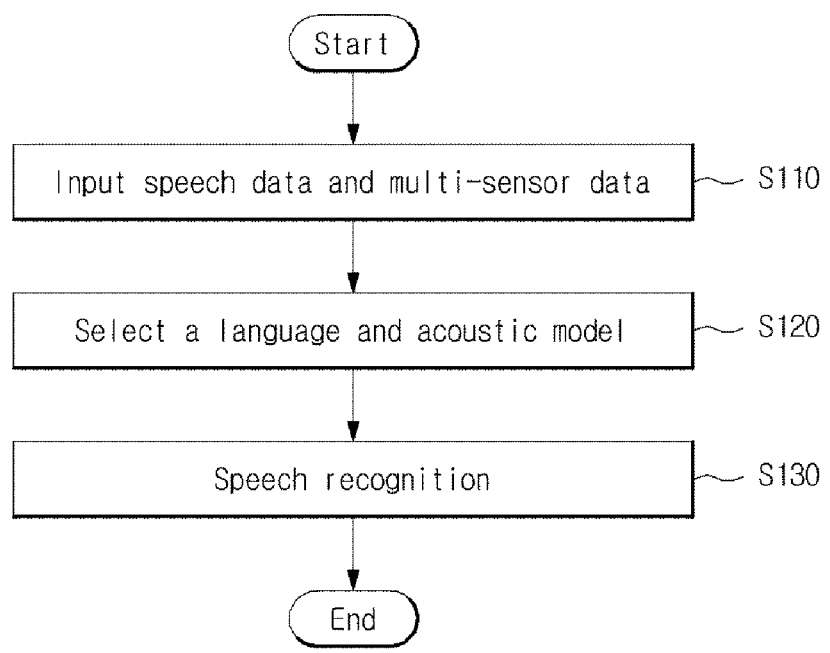
FIG. 2 is a flowchart illustrating a method for operating a speech recognition device according to an embodiment.
Figure 3:
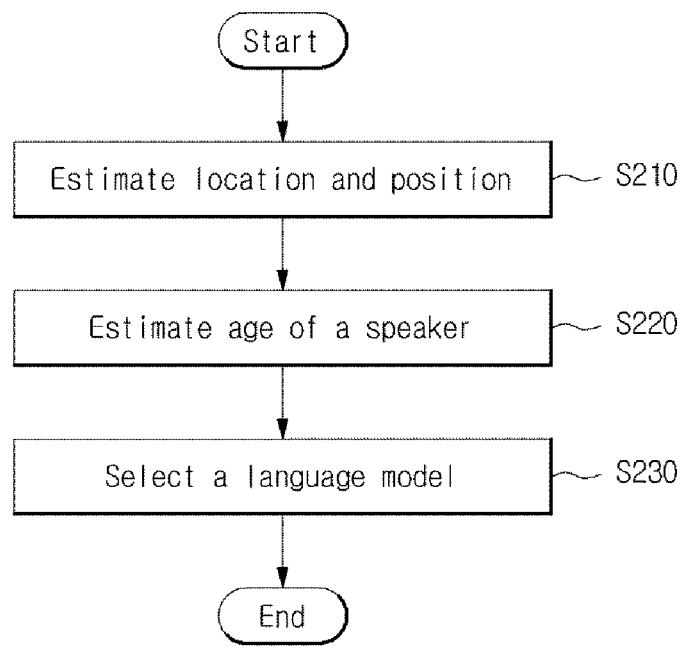
FIG. 3 is a flowchart illustrating a selection of a language model.

FIG. 2 is a flowchart illustrating a method for operating a speech recognition device according to an embodiment, FIG. 3 is a flowchart illustrating a selection of a language model shown in FIG. 2, and FIG. 4 is a flowchart illustrating a selection of an acoustic model shown in FIG. 2.

Referring to FIG. 2, the speech recognition device receives speech data corresponding to speech input from the speech recognition terminal 10 and multi-sensor data corresponding to input environment of the speech (S110), selects a language and acoustic model corresponding to the multi-sensor data among a plurality of language and acoustic models classified according to the speech input environment on the basis of previous multi-sensor data (S120), and transmits speech recognition result for the speech data, obtained by applying the feature vector extracted from the speech data to the language and acoustic model, to the speech recognition terminal (S130).

Referring to FIG. 3, the speech recognition device, when a language model is selected in S120, estimates location and position of the speech recognition terminal 10 on the basis of the location data (S210), estimates age of the speaker on the basis of the image data (S220), and selects a language model on the basis of the location and position and the age (S230).

Referring to FIG. 4, the speech recognition device, when an acoustic model is selected in S120, estimates location and position of the speech recognition terminal 10 on the basis of the location data (S310), estimates age of the speaker on the basis of the image data (S320), estimates signal-to-noise ratio for the speech data on the basis of the proximity data (S330), and selects an acoustic model on the basis of the location and position, the age and the signal-to-noise ratio (S340).

Namely, the communication module 110 receives speech data s1 corresponding to speech input from the speech recognition terminal 10 and multi-sensor data s2 corresponding to the speech input environment.

Here, the communication module 110 may classify the speech data s1 and the multi-sensor data s2 and transmit the result to the model selection module 120 and the speech recognition module 130.

The estimation unit 122 may include a first estimation unit 122a estimating location and position of the speech recognition terminal on the basis of the location data, a second estimation unit 122b estimating age of the speaker on the basis of the image data, and a third estimation unit 122c estimating signal-to-noise ratio for the speech data on the basis of the proximity data.

Accordingly, the second estimation unit 122b can select an acoustic and language model representing a proper gender and age range of the speaker from the pre-classified acoustic and language models by transmitting information as side information for speech recognition, which estimates gender and age of the speaker, along with speech as performance to estimate gender and age is improved using a camera in facial recognition.

The database 124 can classify a plurality of language and acoustic models according to speech input environment on the basis of the previous multi-sensor data and store the result.

Namely, the database 124 can update additionally when the previous multi-sensor data for the speech input environment is input but it is not limited thereto.

The selection unit 126 selects a language and acoustic model from the plurality of language and acoustic models stored in the database 124 through the location and position, the age and the signal-to-noise ratio estimated by the first to the third estimation units 122a-122c and transmits the result to the speech recognition unit 130.

For example, the selection unit 126 identifies location and position of the speech recognition terminal 10 or the speaker on the basis of the location and position estimated from the first estimation unit 122a and selects a language model corresponding to the age range of the speaker on the basis of the age estimated from the second estimation unit 122b.

The selection unit 126, as described above, also identifies location and position of the speech recognition terminal 10 or the speaker on the basis of the location and position estimated from the first estimation unit 122a and selects an acoustic model through age of the speaker on the basis of the age estimated from the second estimation unit 122b and the signal-to-noise ratio estimated from the third estimation unit 122c.

The speech recognition module 130 may include a preprocessing unit 132 and a speech recognition unit 134.

The preprocessing unit 132 extracts the feature vector from the speech data. Namely, the preprocessing unit 132 may classify the speech data into frame units and then extract the feature vector by eliminating frame-basis noise components.

The speech recognition unit 134 then controls the communication module 110 to transmit speech recognition result for the speech data, obtained by applying the feature vector to the language and acoustic model selected from the selection unit 126, to the speech recognition terminal 10.

Meanwhile, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. In addition, the computer program as described above may be stored in computer readable media such as a universal serial bus (USB) memory, a compact disk (CD), a flash memory, or the like, and be read and executed by a computer to implement the exemplary embodiment of the present invention. An example of the computer readable media may include magnetic recording media, optical recording media, carrier wave media, and the like.

In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

The spirit of the present invention has been described by way of example hereinabove, and the present invention may be variously modified, altered, and substituted by those skilled in the art to which the present invention pertains without departing from essential features of the present invention. Accordingly, the exemplary embodiments disclosed in the present invention and the accompanying drawings do not limit but describe the spirit of the present invention, and the scope of the present invention is not limited by the exemplary embodiments and accompanying drawings. The scope of the present invention should be interpreted by the following claims and it should be interpreted that all spirits equivalent to the following claims fall within the scope of the present invention.

DESCRIPTION OF REFERENCE NUMERALS

110: communication module
120: model selection module
130: speech recognition module

What is claimed is:

1. A speech recognition device comprising:
at least one hardware processor configured to:
receive, from a speech recognition terminal, speech data corresponding to a speech input by a speaking person and multi-sensor data corresponding to an environment in which the speech is input by the speaking person, the multi-sensor data being useable as additional information to the speech input for performing speech recognition and the multi-sensor data including an image of the speaking person and estimated location and position of the speech recognition terminal to the speaking person while the speech is input;
select a language model from a plurality of language models for the speech input, the language model being selected as representing a correspondence between a plurality of data among the multi-sensor data including the image of the speaking person of the speech input, the environment in which the speech is input by the speaking person, and the estimated location and position of the speech recognition terminal to the speaking person and previous multi-sensor data including a plurality of data among previous images of speaking persons and corresponding environments in which previous speeches are input;
select an acoustic model from among a plurality of acoustic models for the speech input, the acoustic model being selected as representing a correspondence between a plurality of data among the multi-sensor data including the image of the speaking person of the speech input, the environment in which the speech is input by the speaking person, the estimated location and position of the speech recognition terminal to the speaking person, and an estimated signal to noise ratio (SNR) for the speech data and the previous multi-sensor data including the plurality of data among previous images of speaking persons and the corresponding environments in which previous speeches are input; and
control the speech recognition of the speech input to be performed according to the selected language model and the selected acoustic model which varies in consideration of the plurality of data among the multi-sensor data obtained while the speech is input through application of a feature vector extracted from the speech data to the selected language model and the selected acoustic model, and transmit a result of the speech recognition of the speech data to the speech recognition terminal, wherein the estimated SNR for the speech varies according to a relationship determined between the speech input and proximity of a distance between the speech recognition terminal and the speaking person obtained through the estimated location and position of the speech recognition terminal to the speaking person while the speech is being input.

2. The speech recognition device of claim 1, wherein
the estimated location and position of the speech recognition terminal to the speaking person is based on a basis of location data through one or any combination of a network-based method, a GPS method, a satellite signal-based method, and a WiFi signal-based method; and
the at least one hardware processor is further configured to:
  estimate an age of the speaking person based on the image of the speaking person for the selecting of the language model and the selecting of the acoustic model;
wherein proximity data for the distance is generated by a proximity sensor and the estimated SNR for the speech data is estimated based on the proximity data generated by the proximity sensor.

3. The speech recognition device of claim 1, further comprising:
a database storing the plurality of language models and the plurality of acoustic models classified according to the previous multi-sensor data including the plurality of data among the previous images of speaking persons and the corresponding environments in which the previous speeches are input.

4. The speech recognition device of claim 1, wherein the feature vector is extracted from the speech data during a preprocessing operation of the speech recognition for application to the selected language model and the selected acoustic model.

5. The speech recognition device of claim 4, wherein the extracted feature vector is based on classifying of the speech data into frame units and eliminating frame-basis noise components.

6. A method of operating a speech recognition device via at least one hardware processor, the method comprising:
receiving, from a speech recognition terminal, speech data corresponding to a speech input by a speaking person and multi-sensor data corresponding to an environment in which the speech is input by the speaking person, the multi-sensor data being useable as additional information to the speech input for performing speech recognition and the multi-sensor data including an image of the speaking person of the speech and estimated location and position of the speech recognition terminal to the speaking person while the speech is input;
selecting a language model from a plurality of language models for the speech input, the language model being selected as representing a correspondence between a plurality of data among the multi-sensor data including the image of the speaking person of the speech input, the environment in which the speech is input by the speaking person and the estimated location and position of the speech recognition terminal to the speaking person and previous multi-sensor data including a plurality of data among previous images of speaking persons and corresponding environments in which previous speeches are input;
selecting an acoustic model from among a plurality of acoustic models for the speech input, the acoustic model being selected as representing a correspondence between a plurality of data among the multi-sensor data including the image of the speaking person of the speech input, the environment in which the speech is input by the speaking person and the estimated location and position of the speech recognition terminal to the speaking person, and an estimated signal to noise ratio (SNR) for the speech data, the previous multi-sensor data including the plurality of data among previous images of speaking persons and the corresponding environments in which previous speeches are input;
controlling the speech recognition of the speech input to be performed according to the selected language model and the selected acoustic model which varies in consideration of the plurality of data among the multi-sensor data obtained while the speech is input through application of a feature vector extracted from the speech data to the selected language model and the selected acoustic model; and
transmitting a result of the speech recognition of the speech data to the speech recognition terminal,
wherein the estimated SNR for the speech varies according to a relationship determined between the speech input and proximity of a distance between the speech recognition terminal and the speaking person obtained through the estimated location and position of the speech recognition terminal to the speaking person while the speech is being input.

7. The method of operating the speech recognition device of claim 6, wherein
the estimated location and position of the speech recognition terminal to the speaking person is based on location data through one or any combination of a network-based method, a satellite signal-based method, a GPS method, and a WiFi signal-based method;
the selecting of the language model and the selecting of the acoustic model further comprise estimating an age of the speaking person based on the image of the speaking person; and
wherein proximity data for the distance is generated by a proximity sensor and the estimated SNR for the speech data is estimated based on the proximity data generated by the proximity sensor.

8. The method of operating the speech recognition device of claim 6, wherein
the feature vector is extracted from the speech data during a preprocessing operation of the speech recognition for application to the selected language model and the selected acoustic model.

9. The method of operating the speech recognition device of claim 6, wherein the extracted vector is based on classifying of the speech data into frame units and estimating frame-basis noise components.

* * * * *